United States Patent [19]

Ahlstrom et al.

[11] Patent Number: 4,862,357
[45] Date of Patent: Aug. 29, 1989

[54] COMPUTER RESERVATION SYSTEM WITH MEANS TO RANK TRAVEL ITINERARIES CHOSEN IN TERMS OF SCHEDULE/FARE DATA

[75] Inventors: Mark L. Ahlstrom, Minneapolis; Bruce A. Keller, Vadnais Heights, both of Minn.; Randy S. Storch, Chicago, Ill.

[73] Assignee: SystemOne Holdings, Inc., Houston, Tex.

[21] Appl. No.: 273,657

[22] Filed: Nov. 18, 1988

Related U.S. Application Data

[63] Continuation of Ser. No. 8,223, Jan. 28, 1987, abandoned.

[51] Int. Cl.$^4$ .............................................. G06F 15/26
[52] U.S. Cl. .................................................... 364/407
[58] Field of Search .......................... 364/401, 407–408

[56] References Cited

U.S. PATENT DOCUMENTS 2,542,890  2/1951  Basu .................................... 364/407
2,883,106  4/1959  Cornwell ............................ 364/407
4,449,186  5/1984  Kelly ................................... 364/407

OTHER PUBLICATIONS

OAG Electronic Edition; Dialog Information Retrieval Services, Jan. 1986.

Primary Examiner—Jerry Smith
Assistant Examiner—Gail O. Hayes
Attorney, Agent, or Firm—Dorsey & Whitney

[57] ABSTRACT

A remote data base containing flight schedule, fare, and fare limitations information is accessed from a local computer terminal. The information retrieved is sorted and scored in accordance with a predetermined travel policy stored in the local computer memory, and as applied to a proposed travel itinerary. A ranked list of applicable flights is merged into a single display.

48 Claims, 16 Drawing Sheets

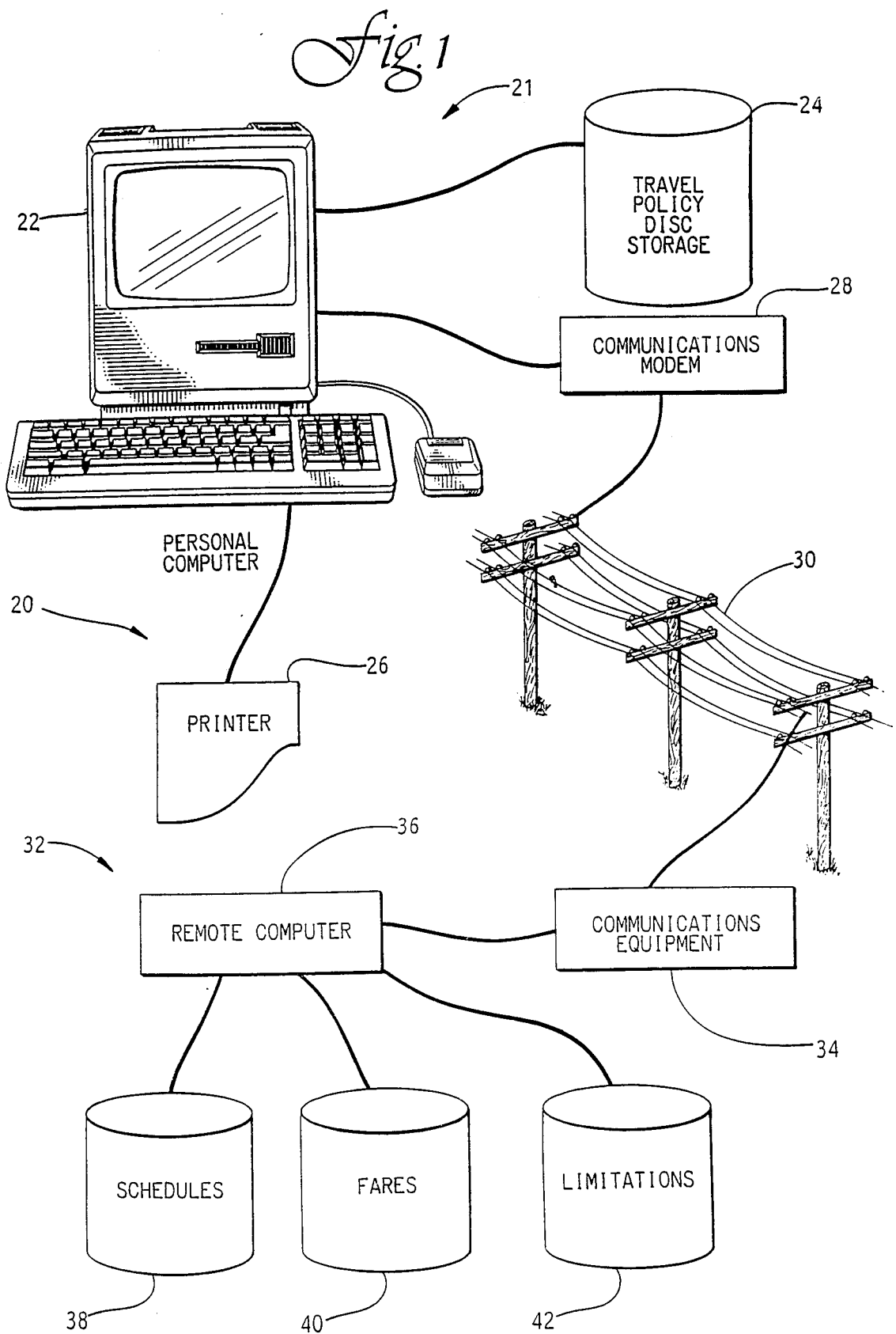

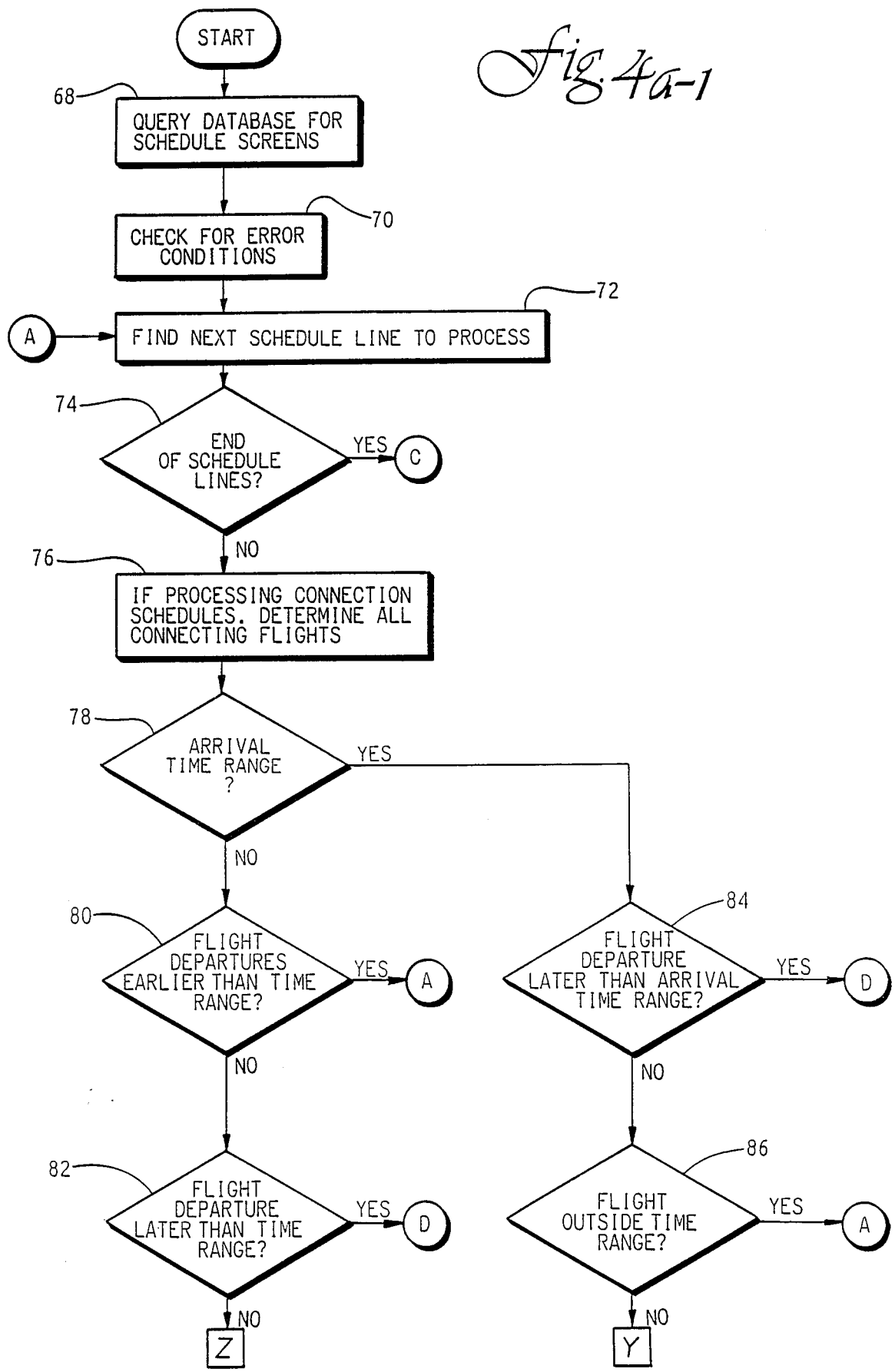

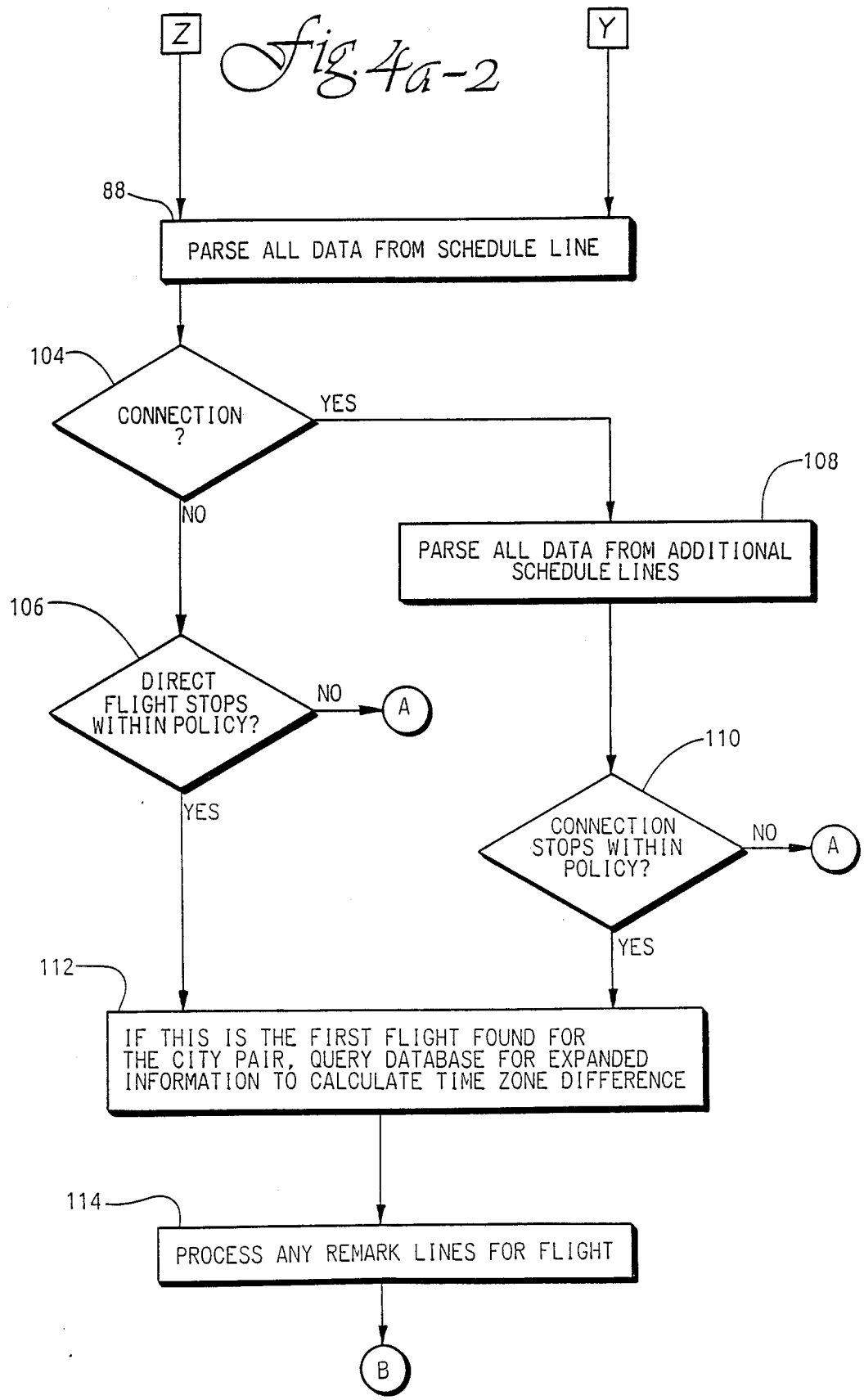

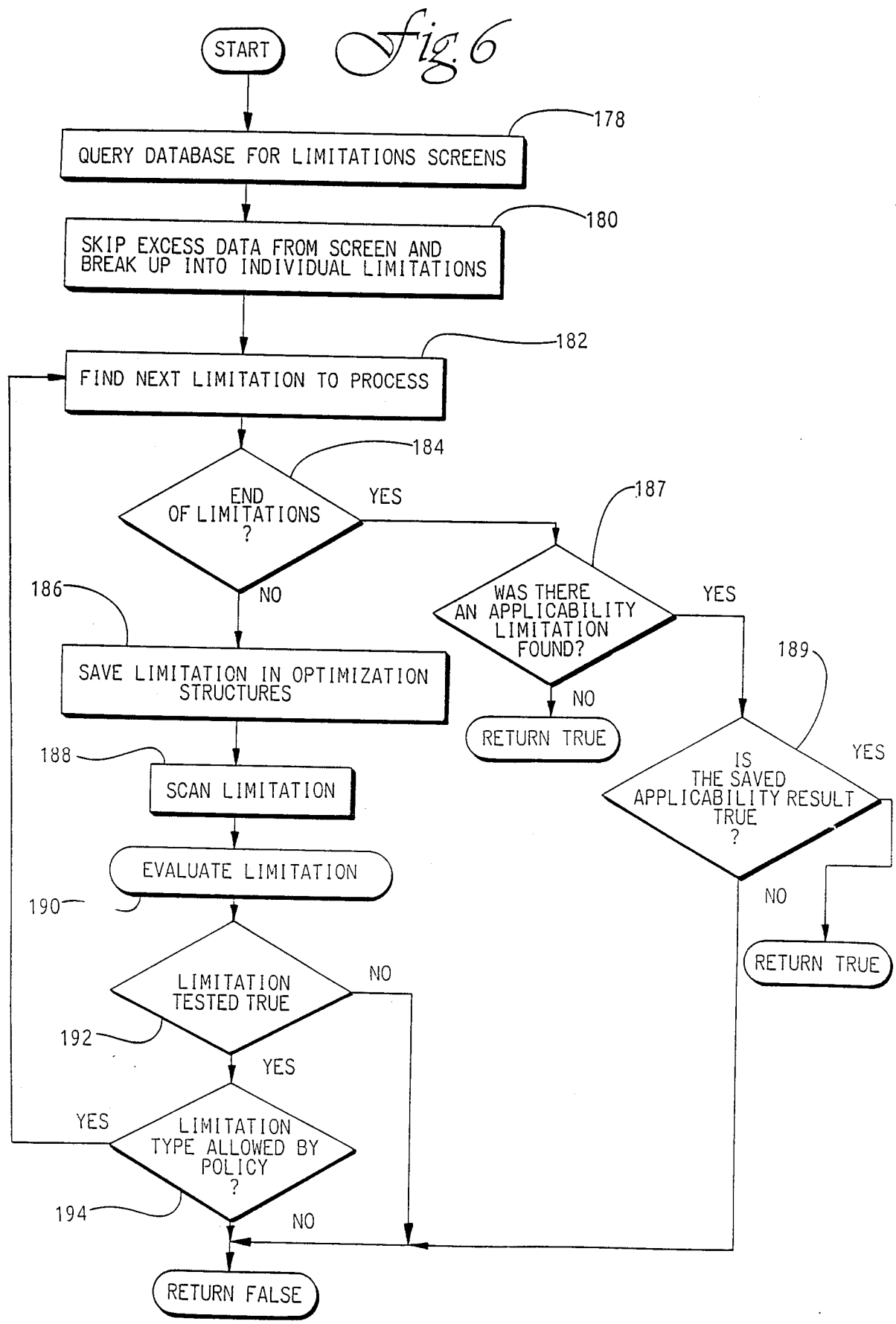

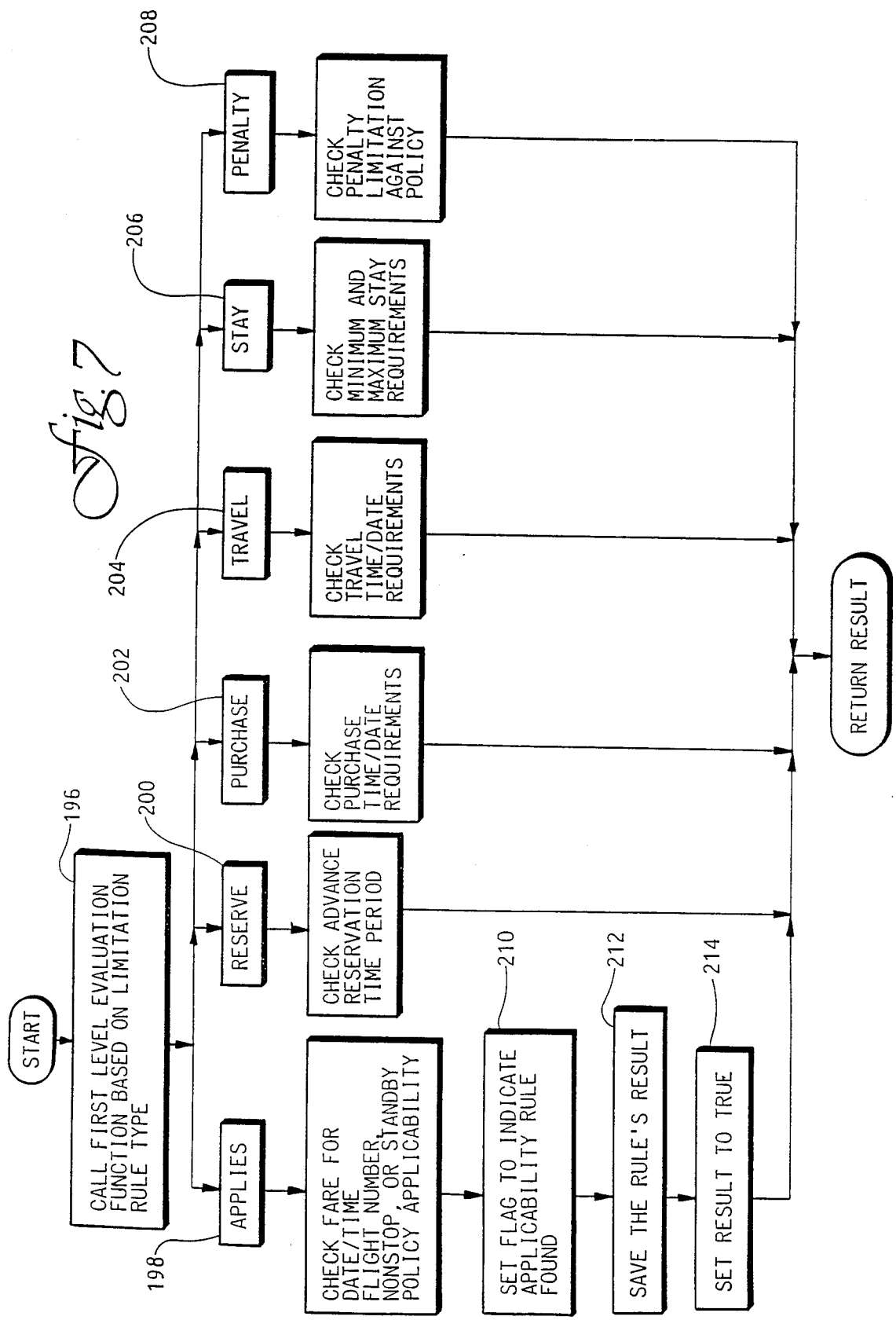

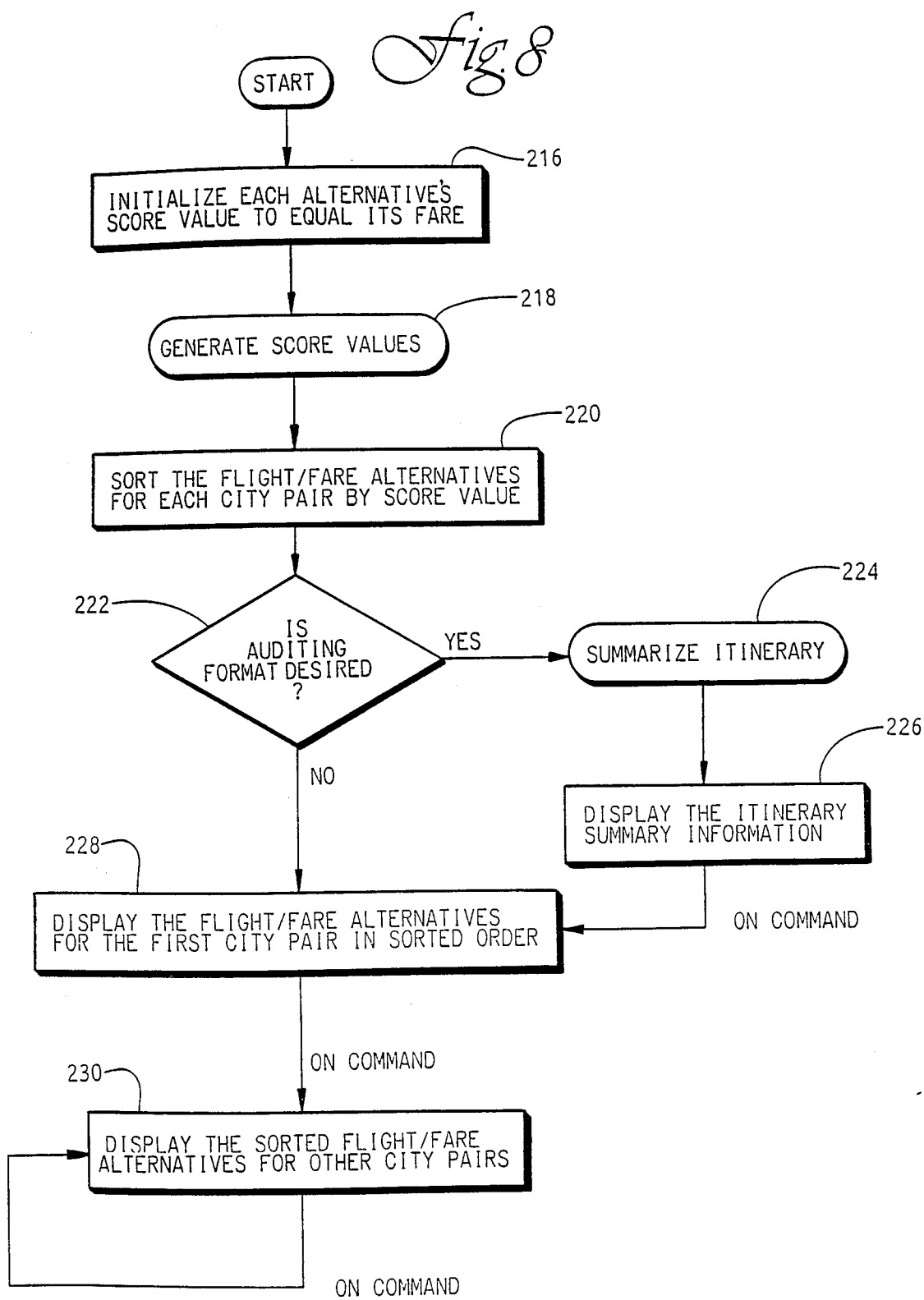

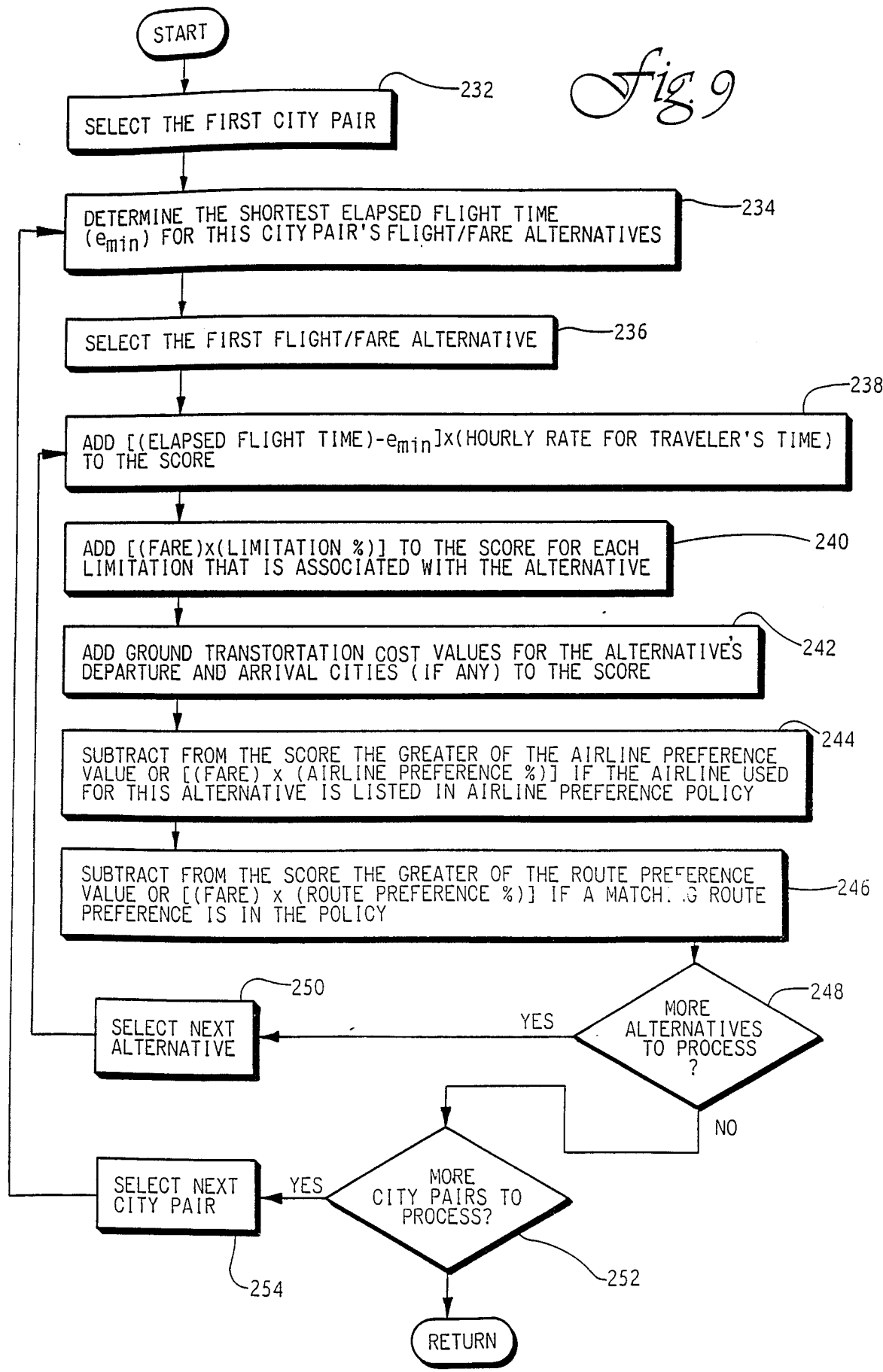

4,862,357

COMPUTER RESERVATION SYSTEM WITH MEANS TO RANK TRAVEL ITINERARIES CHOSEN IN TERMS OF SCHEDULE/FARE DATA

TECHNICAL FIELD

This invention relates to data processing methodology and apparatus for accessing flight scheduling, fare, and fare limitations information and sorting and scoring selected flight schedules and fares from the accessed information in accordance with a predetermined travel policy.

BACKGROUND ART

Deregulation of the airline industry has resulted in the proliferation of varied flight schedules and fares, each with its own particular set of eligibility requirements. Electronic data base services have assisted in the dissemination of flight schedule and fare information, but the effectiveness of such data availability has been limited by its own unmanageable volume. While some companies have developed general travel policies in an attempt to take advantage of competitive flight fares, it has heretofore been difficult to apply a given travel policy to the overwhelming quantity of flight scheduling and fare information. A system that could access flight, scheduling and fare information, and automatically apply a predetermined travel policy to select the preferred travel itinerary from the accessed information would be a decided advantage.

SUMMARY OF THE INVENTION

The problems outlined above are in large measure solved by the present invention. The system disclosed herein provides means for accessing stored flight information, and a method for sorting and scoring the data so received in accordance with a predetermined travel policy. Unacceptable or unavailable flights can be pre-screened, and travel policy considerations such as flight time, airline preference, ground transportation costs associated with particular airports, and layover requirements can be applied to acceptable and available flights for scoring and selection of the best available flight.

BRIEF DESCRIPTION OF THE DRAWINGS

FIG. 1 is a schematic view of a system in accordance with the present invention;

FIGS. 4a-1, 4a-2 and 4b represent a flow chart depicting in greater detail the retrieve flight information step 60 of FIG. 3;

FIGS. 5a-1, 5a-2, 5b-1 and 5b-2 represent a flow chart depicting in greater detail the retrieve fares step 118 of FIG. 4b;

FIG. 6 is a flow chart depicting in greater detail the retrieve and evaluate limitation step 164 of FIG. 5;

FIG. 7 is a flow chart depicting in greater detail the evaluate limitation step 190 of FIG. 6;

FIG. 8 is a flow chart depicting in greater detail the sort and display step 48 of FIG. 2;

FIG. 9 is a flow chart depicting in greater detail the generate score values step 218 of FIG. 8.

DETAILED DESCRIPTION OF THE DRAWINGS

Figure 2:
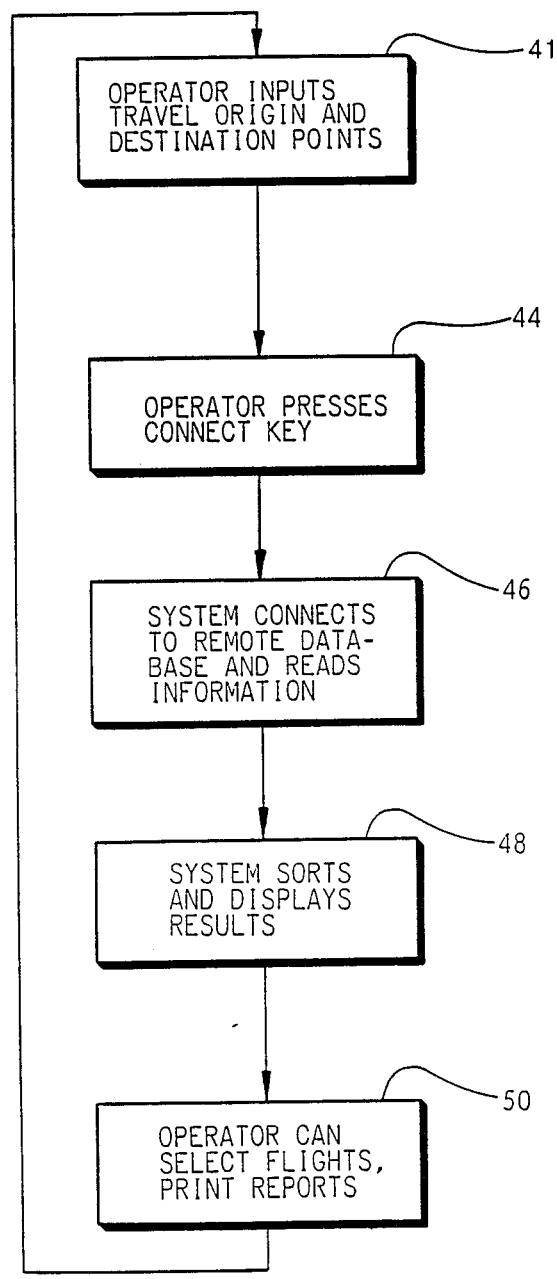
FIG. 2 is a logical flow diagram showing the overall operation of the present invention.

Referring to the drawings, a system for accessing and processing remotely stored flight travel data 20 includes a locally operated computer system 21 having terminal 22 memory storage disk 24 for storing travel policy information, printer 26, and communications modem 28. Modem 28 is connected via land lines 30 to a remotely maintained computer system 32. The computer system 32 includes communications interface equipment 34, computer 36, and a plurality of memory storage disks 38, 40, 42. The remote computer data base is preferably a compendium of travel schedule and fare information, such as the *Official Airline Guides Electronic Edition*, maintained by Official Airline Guides, Inc. of 2000 Clearwater Drive, Oak Brook, Illinois 60521. While the system is shown in conjunction with a remote data base, it will be understood that the sorting and scoring function of the system could be applied to locally stored flight information.

Referring to FIG. 2, operation of the system 20, in its broadest sense, is depicted in flow chart form. The operator of the system 20 inputs a starting location and final destination, together with any desired intermediate stops, at the local computer terminal (step 42). The operator next presses a connect key (step 44), thereby connecting the local computer system 21 to the remote computer system 32. Flight scheduling information fare information, and flight/fare limitation information stored in the remote computer system data base can be read by the local computer system 21, step 46. Once the scheduling, fare, and limitation information is received, the information is sorted and displayed in accordance with the travel policy information stored on disk storage 24, step 48. Once displayed, the operator can select flights recommended by the travel policy software, and can print hard copy reports on printer 26, step 50.

Figure 3:
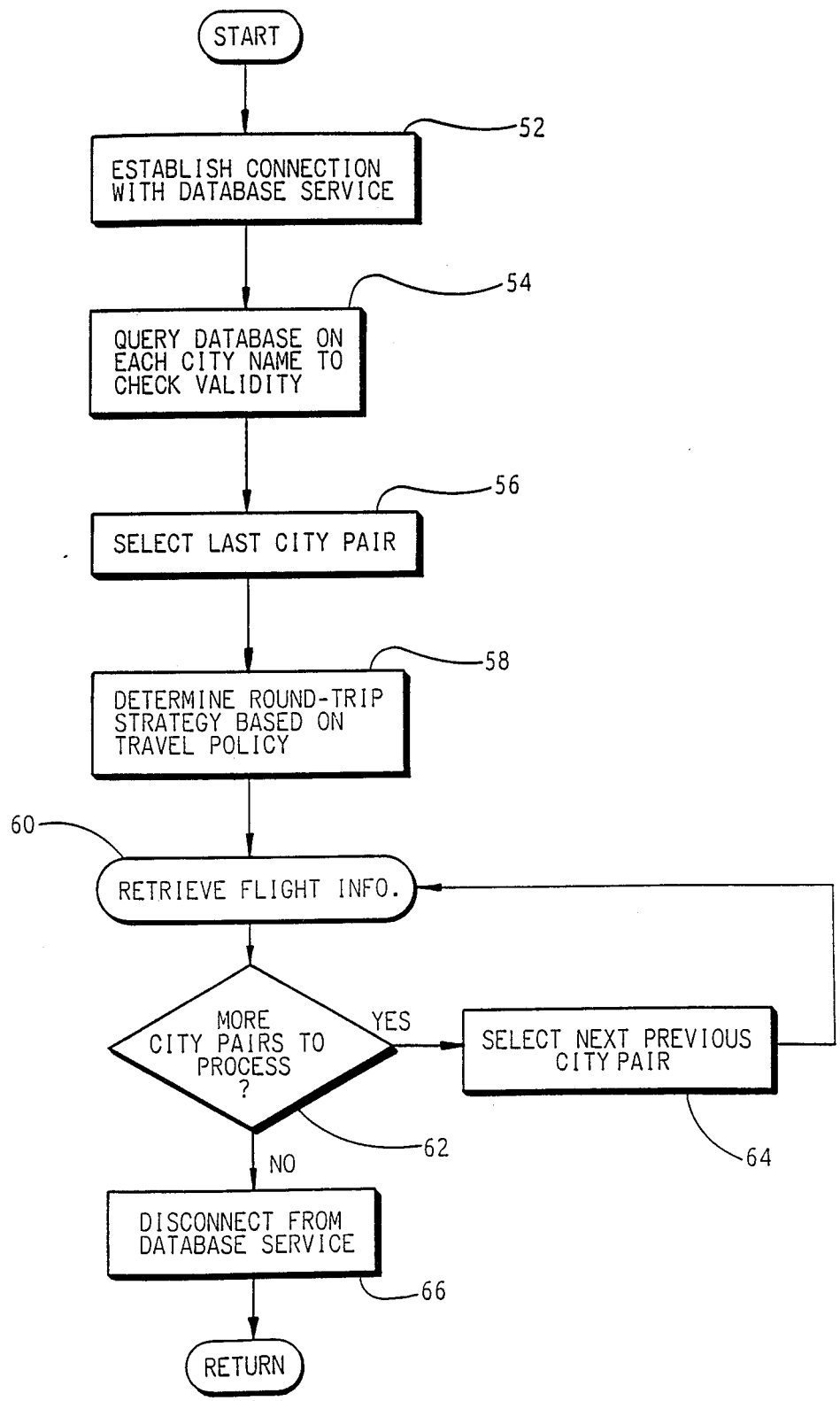
FIG. 3 is a flow chart depicting in greater detail the data access and read step 44 of FIG. 2.
Figure 4:
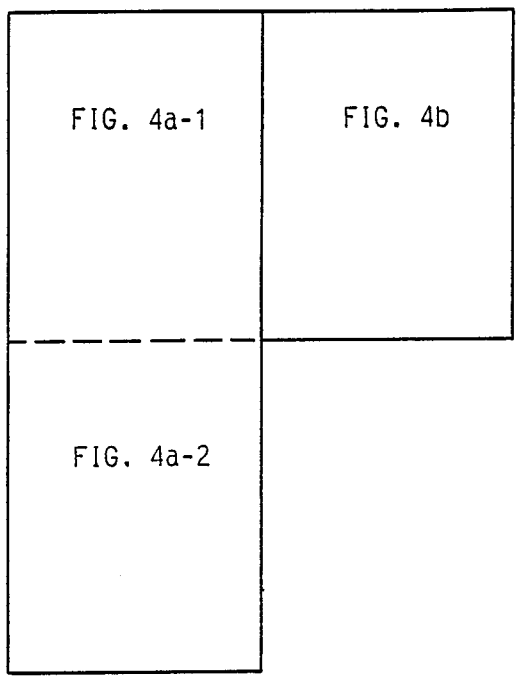

The system connect and read information step 46 of FIG. 2 is set out in greater detail in FIG. 3. Communications with the remote data base service must first be established, step 52. In particular, the phone number, baud rate, account number, password, and other pertinent information needed to establish communications are stored in the local computer terminal, and are used in conjunction with modem 28 to establish communications. Once communications are established, step 54 is undertaken to query the remote data base for the validity of each city name entered by the operator at the local terminal. In particular, the cities entered by the operator in step 42 are checked against the city codes in the remote data base to ensure that the entries input by the operator find correspondence in the data base. Also, in cases where more than one city has the same name, the several alternatives are presented to the operator for selection of the desired city.

Step 56 uses the term "city pair". A city pair comprises a starting and ending point of one leg of a journey. A connecting stop in an intermediate city is not considered a starting or ending point of one leg of a journey. The final leg of a trip (the last city pair) is selected in step 56, for examination of the scheduling, fare, and fare limitation information for that last city pair before the same information relating to the next previous city pair is examined.

Valuable data processing time is saved by considering the last city pair first. The process time saving is based on the premises that most travelers return to their originating place of travel, and that many of the lowest airline fares are based on making a round trip on one carrier, at the same fare class. Once the round trip fare classes and availability information for the return legs of possible round trip pairs in the trip have been gathered, the flights and fares for previous city pairs in a particular itinerary can be quickly scanned to determine whether they can combine with a return city pair leg in a round trip for a round trip fare. If an outgoing flight in a preceding city pair cannot be combined with an incoming flight in a following city pair to make a round trip on the same airline and at the same fare code, there may be no need to read or analyze in detail the information associated with the outgoing round trip fares on the flight.

Additional processing time can be saved if the user, through the travel policy, elects to eliminate round trip fares from consideration under certain circumstances. For example, since many round trip fares require the ticket to be purchased a certain number of days in advance or require a stay over a Saturday night, the travel policy can choose to ignore round trip fares if the itinerary does not allow such limitations to be satisfied. These policy selections are used to determine the strategy that will be pursued for round trip fares in step 58.

Once the last city pair is selected and the round trip strategy determined, flight information is retrieved from the remote data base for the selected last city pair. The loop consisting of steps 60, 62 and 64 retrieves the flight scheduling, fare, and fare limitation information for each city pair, in reverse travel order, for the flight origin and destination points entered by the operator. The system disconnects from the remote data base service, step 66, once flight information for each of the city pairs is retrieved. The flight information so retrieved is then analyzed in accordance with the travel policy stored within the local computer system, as will be described in detail below.

The retrieve flight information step (step 60), is set forth in detail in FIGS. 4-7. As indicated in FIG. 1, scheduling information, fare information, and fare limitation information may be maintained separately and are typically accessed via separate information display screens. The first step in retrieving flight information is to query the data base for scheduling information, step 68. The scheduling information retrieved is quickly checked for obvious errors, step 70. For instance, a city called from the scheduling data base that in fact has no airport, or has no service for a particular airport during a given time of the year, can be quickly screened, and further processing can be foregone.

Scheduling information is typically presented in data screens made up of a plurality of lines of information. Once the scheduling information has been quickly scanned for errors, the information lines are processed one at a time, steps 72 and 74. Information received from the remote data base will include information on direct and connecting flights for any given city. If the travel policy maintained in the local computer terminal allows for a traveler to consider connecting flights (that is flights making up a city pair that require the traveler to change planes), the departure time, arrival time and other information for connecting flights are determined at step 76.

The operator can specify whether flight schedules are to be retained based on departure time or arrival time. Test 78 of the flow chart directs flight departure time scheduling to steps 80 and 82, and directs flight arrival time scheduling to steps 84 and 86. It will be understood that flights scheduled to leave within a specified time range based around a desired departure or arrival time will be acceptable.

Steps 80 and 82 respectively determine whether a particular flight is scheduled to leave earlier than or later than a desired departure time. Flights that are scheduled to leave earlier than the desired departure time range are rejected at step 80 on the premise that the traveler would not be able to make an earlier flight. Flights scheduled to leave after the desired departure time range are rejected at step 82 on the premise that the traveler is not willing to wait for the flight.

Typical flight schedule data bases are not sorted by arrival times. Accordingly, when the operator has designated the arrival time selection of flights, the scheduling data base must b sorted in a different manner than that described above for flight departure scheduling. In particular, at step 84, the program determines whether a particular flight called from the scheduling data base has a departure time after the desired arrival time, on the premise that any flights leaving the originating city after the time a traveler desires to be in his destination cannot possibly be applicable. Flights determined to have a departure time prior to the desired arrival time in test 84, are next analyzed at test 86 to determine whether the stated arrival time for the flight falls within the desired arrival time range. Flight information for flights selected to be within either the desired departure time range or the desired arrival time range is parsed and stored in the locally operated computer terminal, step 88.

Flights determined to have a flight departure time later than the desired departure time range at step 82, and flights having a flight departure time later than the desired arrival time range (at step 84) are referred to test 90 for analysis. Test 90 and step 92 comprise an automatic override step that enables the system to look at connecting flights if the original request entered by the operator was for direct flights only. Program flow is directed from test 90 to test 94 where it is determined whether there are any flights listed on the remote scheduling data base that fall outside the initially designated time range (assuming no acceptable flights have yet been found). If there are no scheduled flights available the program flow is directed to step 96, for recording of the time range examined, and return to step 62 of FIG. 3. Alternatively, program flow is directed to test 98 if there are additional flights outside the initially established time range, where it is determined whether flight selection is being based on departure time or arrival time. Program flow is directed to step 100 if selection is being based on departure time, where one hour is added to the time range, on the premise that a flight departing an hour after the desired departure time is preferable to a flight that leaves before the designated departure time. Program flow is directed from test 98 to step 102 if flight selection is being based on arrival time, where one hour is subtracted from the designated arrival time, on the premise that it is more preferable to arrive at a destination an hour before the preferred time rather than after the selected arrival time. Program flow is directed from step 100 or step 102 respectively back to step 72.

Flight scheduling information pertaining to flights within designated departure or arrival times is parsed and stored at the local computer terminal (step 88). Program flow is next directed to test 104 to determine whether the particular flight under analysis is a connecting flight or not. Program flow for direct flights is directed to test 106 where it is determined whether the direct flight has intermittent stops (since not all direct flights are nonstop flights) and whether the number of stops is acceptable based on the travel policy. Program flow is directed from test 106 to step 72 for consideration of the next flight schedule line, if the stops are unacceptable. Flights determined to be connecting flights at test 104 are referred to step 108 for parsing and storing of the data pertaining to the additional connecting flights that form the connection for the city pair (step 108). Program flow is then directed from test 108 to test 110 for a determination of whether the connecting stops are acceptable. Program flow is directed from test 110 to step 72 if the stops are unacceptable.

Program flow is directed to step 112 from either test 106 or test 110 for each flight which falls within the departure or arrival time range being used, and which includes no stops, or stops that are acceptable. As will be appreciated, airline schedules are typically annotated in local time, as opposed to elapsed time. Time zone difference is therefore calculated at step 112 for the first flight found in a city pair. The time zone difference remains the same for all flights for each respective city pair, and can be used to easily calculate elapsed time for subsequent flights found. Program flow is next directed to step 114 where any remark lines directly associated with flight scheduling information in the remote scheduling data base are processed and stored.

Program flow is next directed to test 116. Test 116 queries the flight schedule information as to whether the flight is on an airline to be excluded from consideration. For instance, the service on a particular carrier may be unacceptable to the traveler, and flights on that carrier can be excluded from consideration by the system. Program flow is directed from test 116 to step 72 to call up the next schedule line to process if the flight analyzed at test 116 is for an unacceptable carrier.

Program flow is directed to the retrieve fares step 118 for each schedule line that refers to a flight on an acceptable carrier, that makes an acceptable number of stops between city pairs, and which either departs or arrives within an acceptable time range. Once the fares for a particular flight are retrieved, program flow is directed to test 120 where an arbitrary number of individual flight schedules to be considered can be set into the program. For instance, rather than examine all possible flights for a particular city pair, the system can be programmed to stop looking for additional acceptable flights once, for example, five acceptable flights are found. Program flow is directed back to step 72 from test 120 if enough acceptable flights have not been found, and is directed to step 96 for return to the system sort and display step 48 if enough acceptable flights have been found.

Figure 5:
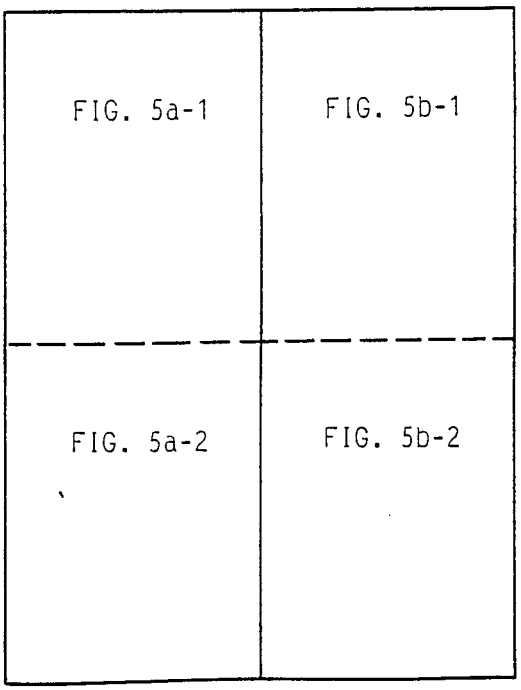
Figure 4B:
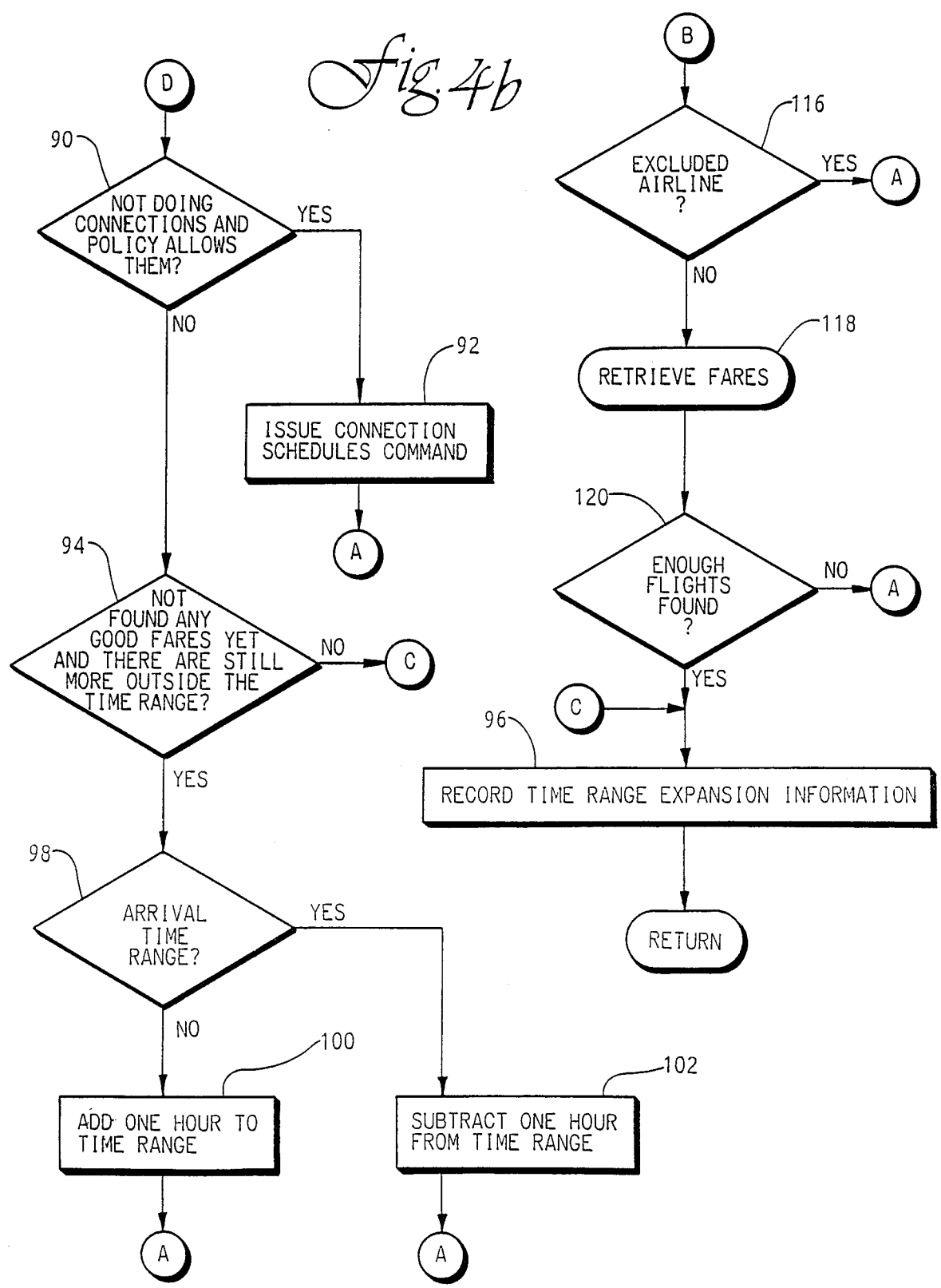
Figures 1, 5A:
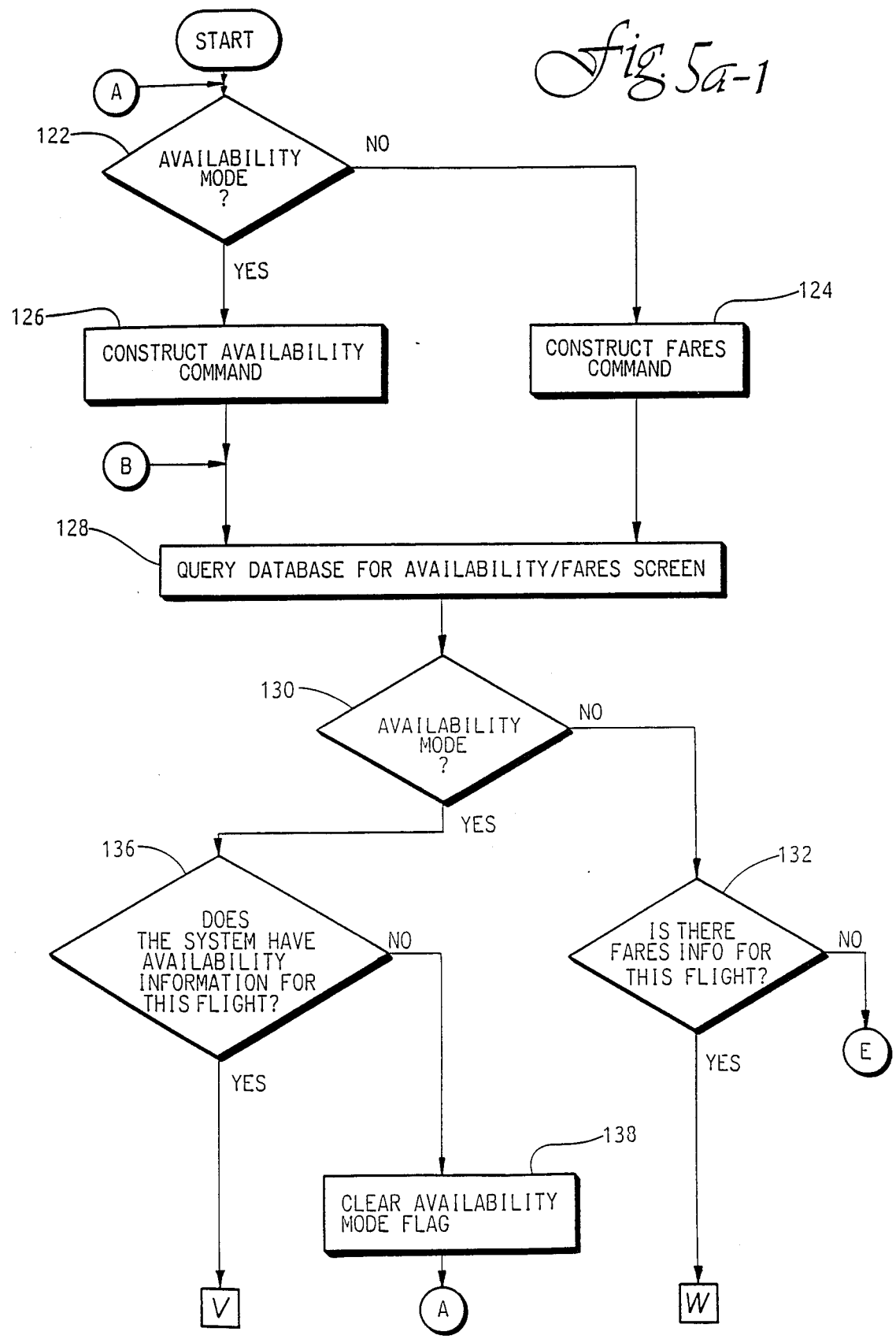
Figures 2, 5A:
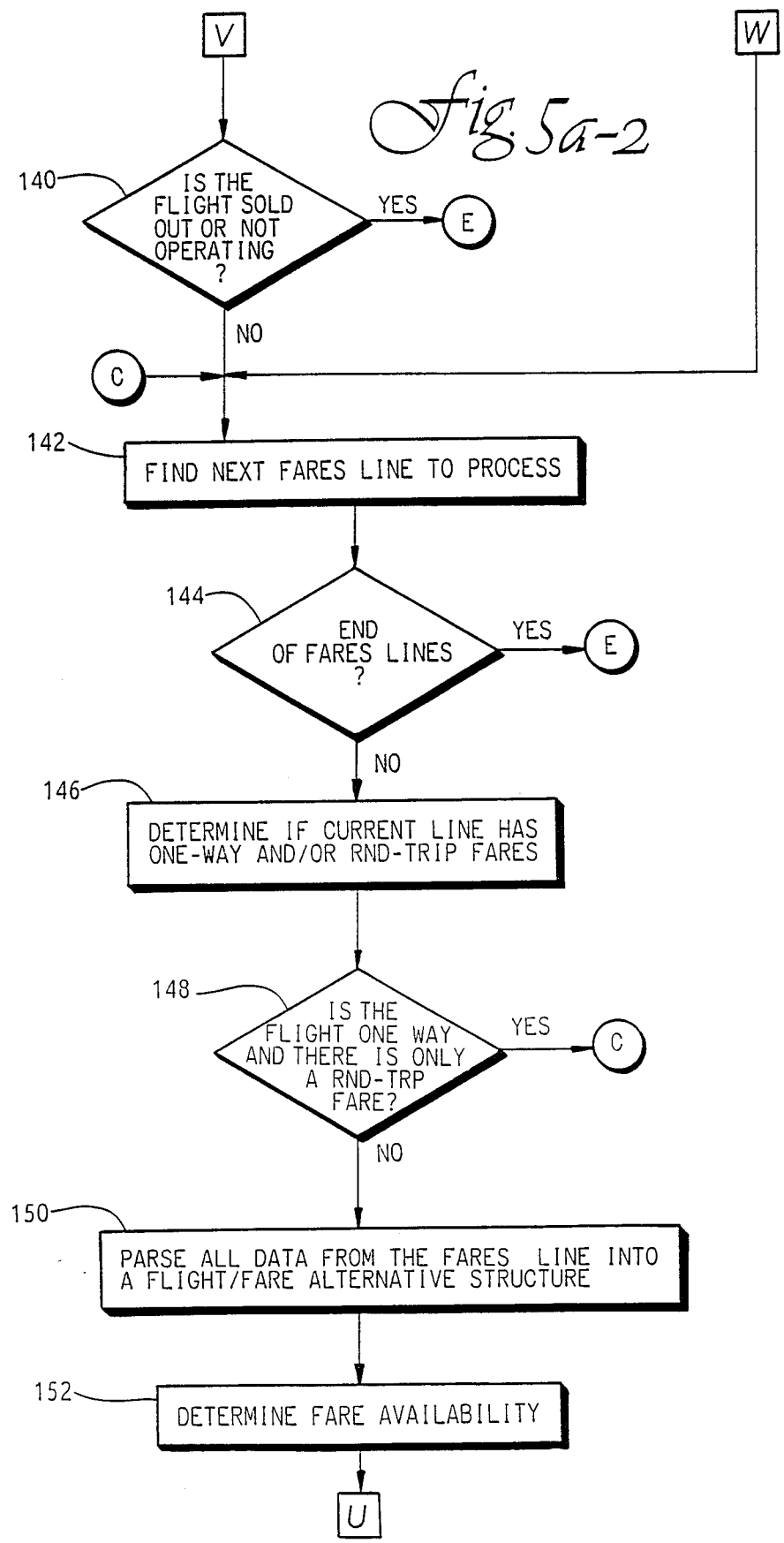
Figures 1, 5B:
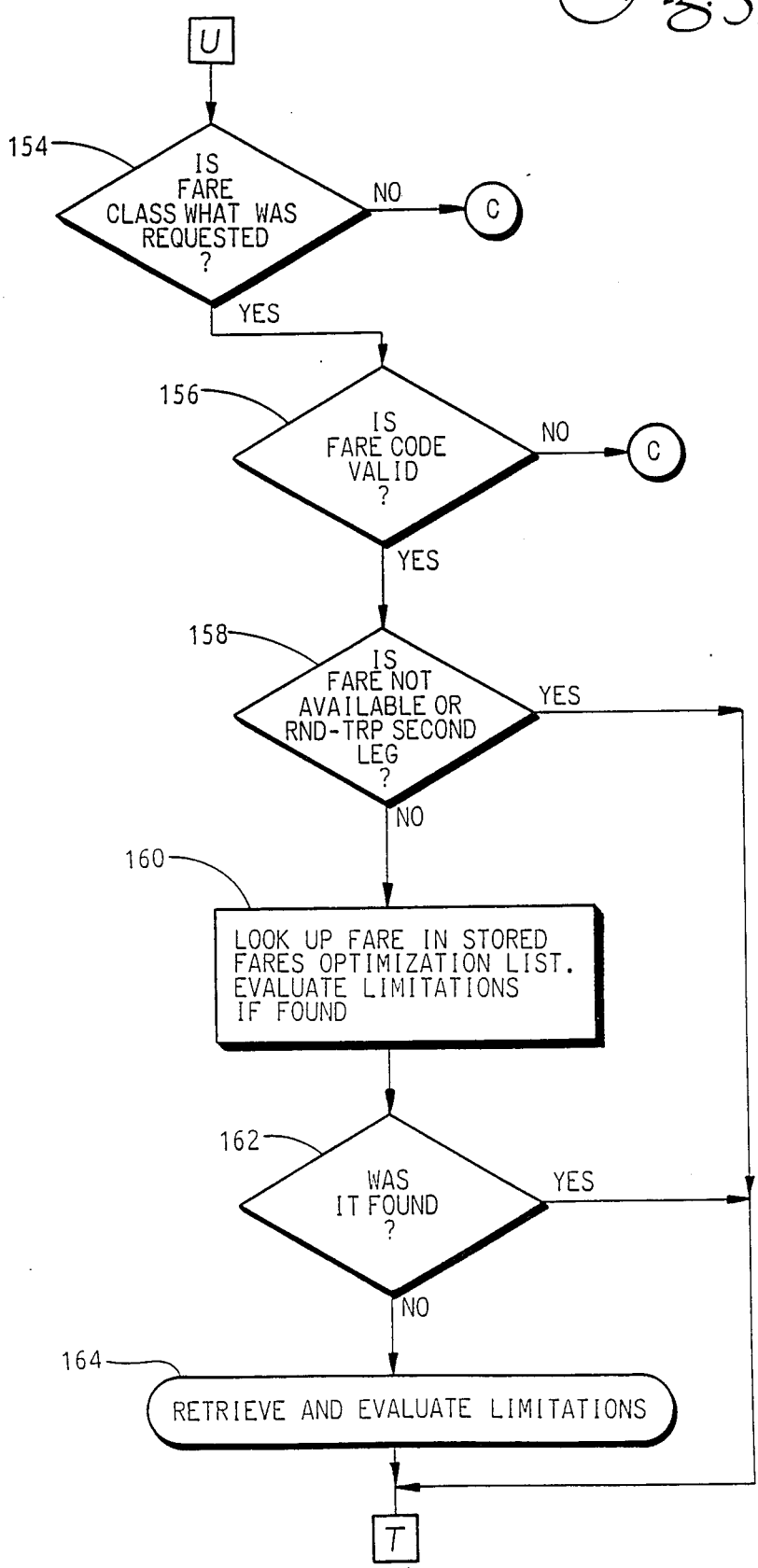
Figures 2, 5B:
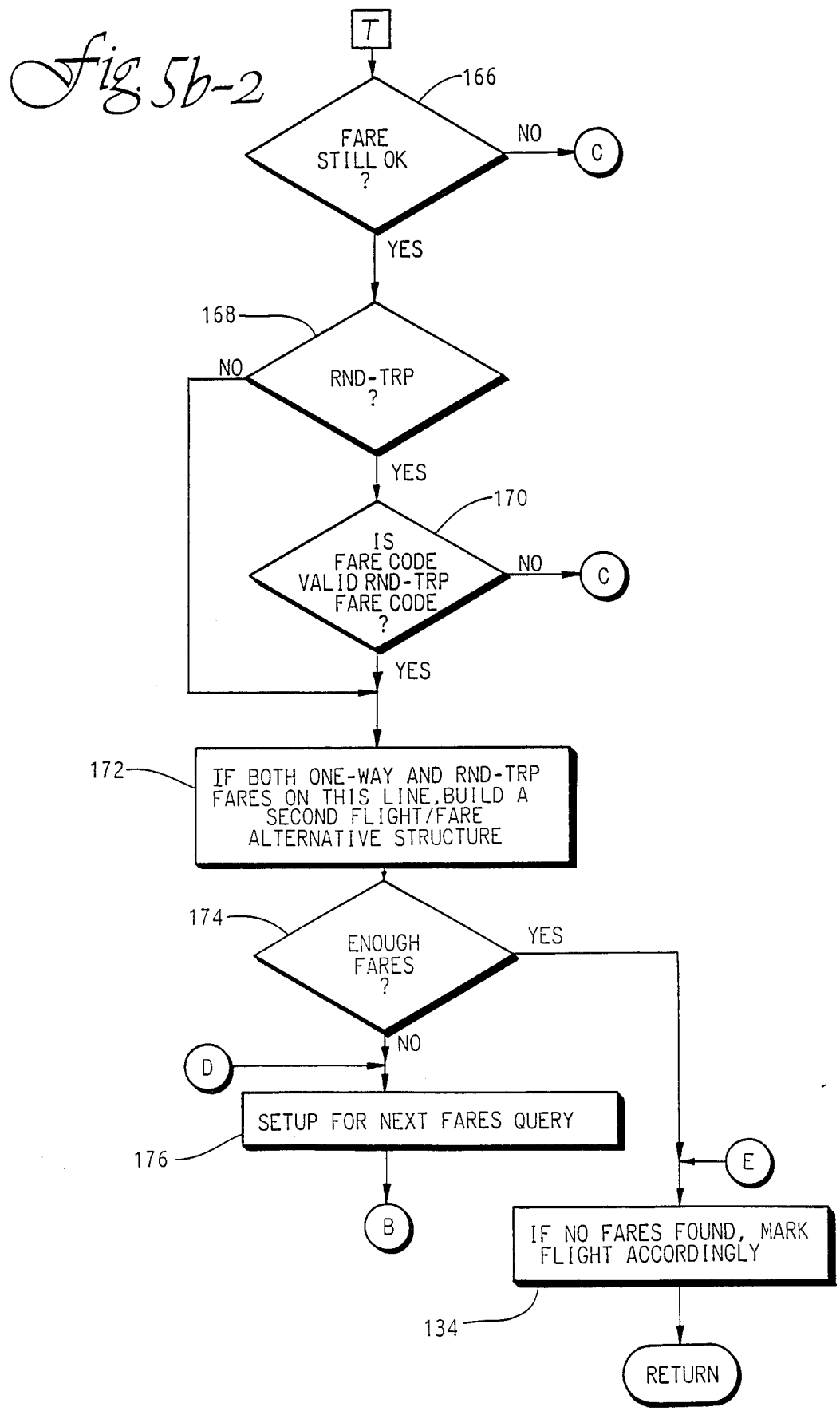

The retrieve fares step 118 is explained in greater detail in conjunction with FIG. 5. As indicated in FIG. 1, fare information is typically displayed separately from scheduling information by remotely accessed data base services. The first step in the expanded retrieve fares flow chart of FIG. 5 is the availability mode test 122. The operator of the program can specify whether fare information only or both fare information and availability information for a particular flight is to be displayed. (Availability information states whether or not the fare is still available for booking.) Program flow is directed to step 124 to construct the fares command if only fares, regardless of availability, are to be displayed. Program flow is directed to step 126 to construct the availability command if both fares and availability are to be displayed. In this regard, it will be appreciated that a particular flight may have a number of different fare codes assigned to it by a particular carrier; reduced fares may apply to only a certain number of seats within a scheduled flight with the full fare applying to the remainder of the seats. Program flow is directed from steps 124 or 126 to step 128 where the availability screen or fares screen respectively, as maintained in the remote data base, is presented in its entirety to the local computer terminal. Program flow is next directed to test 130 where the determination of whether to present availability and fares or only fares is again made. Program flow is directed to test 132 if only fares for the particular flight in question are to be considered and displayed. Test 132 determines whether there is in fact fare information corresponding to the flight in schedule in the remote data base. If there is no fare information available, program flow is directed to step 134 for so marking of the flight, and return to test 120 (FIG. 4).

Program flow is directed from test 130 to test 136 if availability information is to be processed and displayed. Test 136 determines whether the remote data base has the ability to determine whether fare codes are still available. For instance some remote data bases would have to inquire a third remote data base to determine the availability. In the same light, some small airlines may not use computers, and availability information simply is not available. Program flow is directed from test 136 to step 138, where the availability mode is cleared when it is determined that there is no availability information available, and in this case, processing of the flight is restarted at test 122 to gather only fare information for the flight. Program flow is directed from test 136 to test 140 when availability information is available, for determination of whether the flight in consideration is sold out or not operating. Program flow is directed to step 134 for appropriate marking of the flight and return to step 120 of FIG. 4 if it is determined that the flight is sold out or not operating.

Once it is determined that there are fares for the flight in question, program flow is directed to step 142 where the flight/fare information is processed one line at a time. Test 144 determines whether all lines of fare information have been analyzed. Program flow is directed to test 120 if all of the fare lines in the data base pertaining to the flight in question have been queried. Program flow is directed to step 146, if each of the fare lines have not been queried, for determination of whether the current line being processed has one-way and/or round trip fares within the fare line. In this regard, it will be appreciated that certain fare codes are specified by the airlines for use only in round trip situations. Program flow is directed to test 148 for determination of whether the fare line under consideration contains only a round trip fare and the proposed flight origin and destination points require a one-way trip. (For instance, when the city pairs under consideration cannot be paired to form round trips, only one-way fares need be considered.) If the flight origin and destination points do call for a one-way flight, and there are no one-way trip fares listed, program flows is directed by test 148 to step 142 for processing of the next fare line. Program flow is directed from test 148 to step 150 for parsing and storage of the fare data from the fare line in question if there is one-way flight information available, or if the city pairs allow a round trip flight and round trip data is shown. Program flow is then directed to step 152 for determination of fare availability, when the retrieve fares portion of the flow chart is being operated in the availability mode. In any case, program flow is directed to tests 154, 156, 158 for determination of whether the fare data located in the fare line under consideration meets certain travel policy criteria.

Tests 154, 156, 158 are designed to quickly evaluate information that is readily discernable from the fare code line, without having to access the limitations data base. In this regard, it will be appreciated that fare limitations data bases are typically maintained in plain language, rather than code, and are time intensive to process and analyze. Test 154 quickly checks to see whether the fare class (i.e., economy, coach, first class) is acceptable in accordance with the travel request input by the operator. If the class is unacceptable the program is immediately directed to step 142 to process the next fare line from the remotely stored fares data base.

Program flow is directed to test 156, if the fare class is satisfactory. Test 156 takes advantage of the fact that many fare codes are designed to reflect limitations for the fare. For example, an "X" followed by digits "X23" appearing in a fare code typically means that a fare designated by the fare code is good except on Tuesday and Wednesday. Other limitations that can be discerned directly from a fare code can be, for example, that the fare code is good only at a particular airport, or that advance purchase must be made 14 days or more prior to a flight. Test 156 directs program flow to the next available fare line if it can be discerned from the fare code that the fare in question is not acceptable.

It will be recalled that the system analyzes the final leg, or city pair, of an itinerary first, and that each city pair is analyzed to determine whether it can be paired with another city pair so as to be viewed as part of a round trip. Test 158 is designed to save the system the time of accessing the remotely stored limitations data base if it is determined that the particular fare in question is not available, or if the fare line under consideration is for the second leg of a round trip fare. In the later case, the limitations data base will not be accessed for the particular fare until the system has determined the availability of a first leg of a round trip that can be matched with the fare code of the round trip second leg fare. It will be appreciated, in this regard, that the limitations associated with the first leg of the round trip apply to the entire round trip, and the limitations associated with the second leg of the round trip do not have to be accessed.

Program flow is directed to step 160 if the tests of 154, 156 and 158 are successfully met. Step 160 takes advantage of the fact that a given fare code on a given airline between a given pair of cities will always be associated with the same list of limitations. The fare code being analyzed is compared to an "optimization list" of fare codes that have already been encountered in the current processing session, as described below. If a fare code under consideration is found in the optimization list, there is no need to access the remote limitations data base. Test 162 routes the program flow around the retrieve and evaluate limitations step 164, in the event that the fare code under consideration is found in the optimization list.

The retrieve and evaluate limitations step 164 provides for the accessing of the remotely stored limitations data base, as explained in greater detail in FIGS. 6 and 7. Once the retrieve and evaluate limitation step is accomplished, program flow is directed to test 166. Test 166 queries the limitation information retrieved in the retrieve and evaluate limitation step 164, to determine whether the fare line being analyzed is still acceptable, in light of the fare limitations, in accordance with the predetermined travel policy. If the fare limitations are not acceptable, program flow loops to step 142 for analysis of the next fare line.

Program flow is directed to test 168 if the limitations for the fare line being analyzed are acceptable. Test 168 analyzes the fare line to determine whether it pertains to a round trip. If the fare line being analyzed does pertain to a round trip, the program flow is directed to test 170 to determine whether the fare code is a valid round trip fare code. In particular, if the fare being analyzed is for a return leg of a round trip, the fare code is assumed valid because the program has as yet not analyzed whether there is an acceptable outbound leg that can be joined with the return leg to complete a valid round trip. When the fare code being analyzed applies to an outbound leg of a round trip, the fare code being analyzed for the outbound leg is valid only if the system has previously identified a return leg which can be matched with the outbound leg. Program flow is directed by test 170 to step 142 if the fare code being analyzed is determined to not be a valid round trip fare code.

Program flow is directed to step 172 if the fare line being analyzed is not for a round trip, as determined by test 168, or if the fare code for the line being analyzed is a valid round trip fare code, as determined in test 170. It is not untypical for fare data contained within a remotely stored fare data base to include both a one-way and round trip fare. The system, at step 172, splits the two fare prices into separate flight/fare structures, so the program can deal with the one-way cost and round trip cost separately.

Program flow is next directed to test 174 where the number of fares already analyzed by the system is compared to a preset number to determine whether an adequate number of fares have been analyzed. Program flow is directed to test 120 of FIG. 4 if an adequate number of fares have been analyzed. Program flow is directed from test 174 to step 176 if more fares are to be analyzed.

The retrieve and evaluate limitation step 164 of FIG. 5 is set out in greater detail FIGS. 6 and 7. As discussed above, and with reference to FIG. 1, scheduling information, fare information, and fare limitations information are typically displayed separately by remote electronic flight scheduling information services. Program flow, as described above, first determines which flight schedules are applicable to a proposed travel itinerary, and then determines which fare are acceptable for applicable scheduled flights. Fare limitations, that is, the requirements to be met for eligibility for a particular fare, are sometimes reflected in the fare code. More often, however, the fare limitation information for a particular fare is maintained in a separate limitations data base in plain English language entries.

The fare limitations data base is queried for limitations screens maintained therein in step 178 of FIG. 6. Step 180 scans through the header information of each limitation screen and then breaks the remaining text into individual limitations. The program flow is directed to step 182 for processing each of the limitations in serial order. Test 184 determines whether all of the limitations have been analyzed, and program flow proceeds to step 186 if there are more to process. Each limitation is saved in step 186, to be incorporated into the optimization list referred to above in 160. The stored fare limitations are thereby available when the system processes other fares for the same airline on the same that include the same fare code, thereby circumventing the need to access the fare limitations data base more than once.

The plain language limitations are scanned and parsed in step 188. The parsed limitations are grouped into general limitation types (categorizes of limitations, as advanced purchase or cancellation penalty limitations that can easily be referred to in the sort and display result step 48. Scanning and parsing can be accomplished through well-known techniques such as recursive descent parsing with BNF parsing rules, or similar parsing technology.

The scanned limitations are evaluated in step 190, as described in detail in conjunction with F 7. Test 192 queries whether any of the limitations in step 190 render the flight/fare alternative under consideration unavailable (for instance, a limitation requiring travel on dates other than the planned travel date entered by the operator), and directs program flow to test 166 of FIG. 5 to consider the next flight/fare alternative if a tested limitation renders the flight/fare alternative unavailable.

Test 194 checks to see if the limitation type that was determined above is acceptable based on the travel policy. For instance, as part of the policy, the operator can say that "all fares with cancellation penalties are unacceptable", and similarly for other types of limitations.

The term "applicability limitation" must be understood to understand the inquiry of test 187. Air flight/fare code limitations typically include limitations that a fare code is "only applicable on flight XYZ". The same list of limitations for the same fare code may also include a limitation that the fare is "only applicable on flight ABC". It is understood in the industry, in this case, that either flight XYZ or flight ABC is acceptable. So-called "applicability" limitations will always test true in test 192, and will be saved, for comparison against subsequent applicability limitations found for the same fare code.

Once each of the limitations for the fare code have been analyzed, as determined by step 184, program flow is directed to test 187. Test 187 determines whether an applicability limitation for the fare code being analyzed was found. If no applicability limitations were found, the program flow is directed to test 166 of FIG. 5, returning "true"; that is, no unacceptable limitations were found. Program flow is directed to test 189 if applicability limitations were found, to determine whether any of the applicability limitations are acceptable. The program flow is directed to test 166 of FIG. 5 with a "true" result if the applicability limitations are acceptable, or returns "false" if the acceptability limitations are not acceptable.

The evaluate limitations step 190 is depicted in greater detail in FIG. 7. The scan limitation step 188 of FIG. 6 reduces each of the plain language limitations into an identifiable code. Step 196 reviews the code generated by the scan limitation to determine what type of limitation has been analyzed. Depending on whether the limitation is an applicability limitation, reserve limitation, purchase limitation, travel limitation, stay limitation, or penalty limitation, the program flow is directed to step 198, 200, 202, 204, 206, or 208 accordingly. The evaluation process compares the limitation text against the travel circumstances to determine whether a limitation excludes the particular flight/fare combination in consideration. Note that step 198 includes the steps of 210, 212 and 214 to save whatever applicability rules have been found for analysis of the applicability rules in accordance with the steps described above in conjunction with FIG. 6.

The process described above defines and ascertains a plurality of flight/fare alternative from the remotely accessed flight information data base. That is to say, each fare for each flight that is determined to be acceptable comprises a flight/fare alternative structure as presented to the locally operated computer system at the locally operated computer terminal 22. It is to be understood that a single flight may have several different valid flight/fare alternative structure, since different fares may apply to a single flight.

Once each of the flight/fare alternative structures is ascertained from their remote data base, communications with the remotely accessed data base are terminated. The system then proceeds to step 48, the sort and display results step, for determination of which of the acceptable flight/fare alternatives are the most preferable in accordance with the previously determined travel policy. A scored and sorted display of each of the flight/fare alternative structures for each city pair is presented to the operator.

Figure 10:
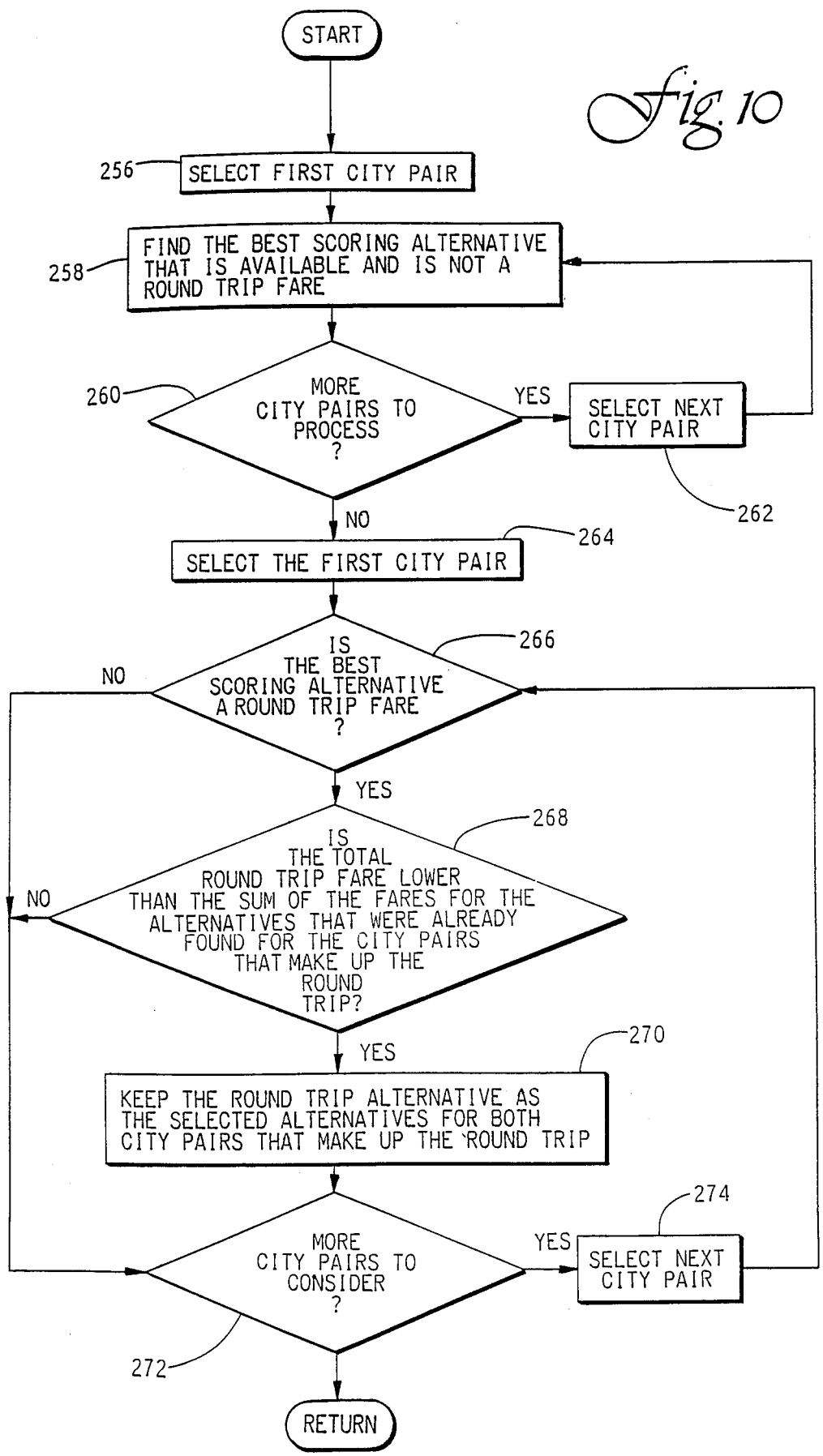
FIG. 10 is a flow chart depicting in greater detail the summarize itinerary step 224 of FIG. 8.

The sort and display step 48 is set forth in detail on FIGS. 8 through 10. Each flight/fare alternative is assigned an initial score equal to the dollar value of its fare, step 216. Program flow is next directed to step 218 where the initialized score value is modified in accordance with predetermined travel policy factors. The scoring process of step 218 is set forth in greater detail in FIG. 9, described in detail below. . Once scored, the flight/fare alternatives are sorted by score value, step 220.

The scored and sorted flight/fare alternatives can be displayed for auditing purposes, or for flight selection purposes. Test 222 directs program flow to the summarize itinerary step 224 and display summarized itinerary step 226, when auditing is desired, and to step 228 when the auditing display is not selected. The flight/fare alternative structures are displayed for the first city pair in sorted order at step 228, and, on command, the flight/fare alternatives for the city pairs in the travel itinerary are displayed at step 230.

The generate score value step 218 is described in greater detail in conjunction with FIG. 9. As described above, certain travel policy items are used to completely eliminate a flight/fare alternative from consideration. For instance, if a particular travel policy states that no flight requiring 14 day advance booking will be considered, flights having flight/fare codes requiring 14 day advanced booking will be screened during the system connect to remote data base and read information step 46. Flight/fare structures that are not so screened are ranked by relative merit. Step 218 takes each of the flight/fare alternatives that passes initial screening, and scores each flight/fare structure according to the predetermined, stored travel policy. In particular, each flight/fare structure is scored with reference to elapsed flight time, ground transportation costs associated with the particular flight, particular airline preference, route preference, and preweighted scoring of various flight/fare limitations.

The first city pair having flight/fare alternatives to be scored is chosen in step 232. The shortest elapsed flight time ($e_{min}$) of all the flight/fare alternatives presented for a particular city pair is determined in step 234. Once $e_{min}$ is determined, program flow is directed to step 236 to select the first flight/fare alternative for the city pair under consideration.

The initialized score (pertaining to the raw dollar fare value) for the first flight/fare alternative is readjusted in step 238 to account for elapsed flight time considerations. In particular, the difference between the elapsed flight time of the flight/fare alternative under consideration and $e_{min}$ is multiplied times a preassigned hourly rate for the traveler's time. For instance, if a particular flight/fare alternative is a longer flight than the shortest flight by half an hour, and the traveler's flight time was evaluated at $50 an hour, a value of $25 would be added to the flight/fare alternative's initialized score.

Program flow is next directed to step 240, where adjustment is made to the flight/fare alternative score in accordance with any limitations associated with the flight/fare alternative. For instance, a travel policy decision may be made that is acceptable to have a minimum stay limitation on a flight, but that it would be preferable to pay a certain percentage greater fare if a flight/fare alternative were available that didn't have a stay limitation associated with it. The fare of the flight/fare alternative is multiplied by the preassigned percentage value for the limitation, with the result added to the score value.

Program flow is next directed to step 242, where ground transportation costs associated with a particular flight/fare alternative are taken into consideration. Step 242 is based on the premise that most business travelers going to a particular city will have a usual place of business within the city traveled to. Certain cities, such as Chicago, have multiple airports, and certain metropolitan areas, such as New York City, are serviced by different airports in different cities. The cost of ground transportation from any one of the alternative airports in a given city to the traveler's usual place of business can be taken into consideration when evaluating different flight/fare alternative structures by adding the cost of ground transportation to the initialized score value for the particular flight/fare alternative.

Program flow is next directed to step 244 where the scoring process takes into consideration a preference for a particular airline. For example, a company may negotiate a contract with an airline for a certain percent reduction of all flights flown by its personnel on the particular airline, or it may be a company policy to prefer a particular airline for its service or incentive program. The preference may be stated in either a set "airline preference value" or may be stated as a certain percentage of the fare. 244 subtracts from the flight/fare alternative score either the set preference dollar value, or the percentage of the fare value, when the flight/fare structure is for an airline that has been designated as a preferred airline.

Program flow is next directed to step 246 where the flight/fare alternative under consideration is evaluated in terms of whether it is on a preferred route. Similar to the airline preference consideration above, a company may be in a position to negotiate a special price for is personnel traveling on a particular flight or on a particular route. The departure airport, the arrival airport, the airline to be flown and the flight number can all be designated as part of a preferred route, with either a set money value or a percentage of the fare value assigned to indicate a preference for the preferred route. The assigned preference value is subtracted from the flight/fare alternative score to indicate that the flight/fare alternative under consideration is a preferred route, and should be given preference in the selection of a flight/fare alternative.

Program flow is next directed to steps 248 and 250 for selection of the next flight/fare alternative to be scored, and is directed to steps 252, 254 for selection of the next city pair to be scored. Program flow is redirected to step 220 of FIG. 8 when each flight/fare alternative for each city pair has been scored.

The scoring process outlined above in connection with FIG. 9, provides a score value for each separate flight/fare alternative in each city pair of the itinerary. The scored flight/fare alternatives are presented to the operator of the computer terminal 22 for selection of the desired travel itinerary. Although scoring is done on each flight/fare alternative, for each city pair, the operator cannot simply select the best scoring flight/fare alternative from each city pair to obtain the overall best itinerary. Assuming round trip fares are available, additional considerations must be met to comply with eligibility for round trip fares. Steps 222, 224 and 226 of FIG. 8 provide a means for including round trip fare considerations in selecting the flight/fare alternative from each city pair to obtain the best overall itinerary. This selection of flight/fare alternatives allows the system to display a recommended fare for the entire itinerary which is useful for auditing travel that has been booked through other sources.

In particular, the auditing process is begun at step 256 of FIG. 10 by selecting the first city pair. Each flight/fare structure for the city pair is analyzed in the loop consisting of step 258, 260 and 262 to find the best scoring one-way fare that is available for booking. Once determined for all city pairs, program flow is directed from test 260 to step 264 where each of the city pairs is again selected for consideration in terms of round trip fares. Test 266 makes the determination of whether the best scoring alternative that is available for booking for the city pair, which could be based on either a one-way or round trip fare, is in fact based on a round trip fare. Program flow is directed from test 266 to test 268 if the test flight/fare alternative is in fact a round trip fare. Test 268 makes the determination of whether the total round trip fare is lower than the sum of the fares for the flight/fare alternatives that have already been identified for the two city pairs in the round trip. If the answer is yes, the round trip alternative is selected as the best flight/fare alternative for both of the city pairs in step 270.

Program flow is directed from test 266 or 268 respectively to test 272, if the best scoring flight/fare alternative for a city pair is based on a round trip fare, or if the total round trip fare is not lower than the sum of the fares for the flight/fare alternatives already identified for the city pairs. Program flow loops back to test 266 for selection of the next city pair via step 274 if there are more city pairs to consider.

We claim:
1. A system for providing a plurality of alternative travel itineraries ranked in order of preference in accordance with previously stored travel policy data, comprising:
means for accessing a data base comprising travel data including separately maintained travel schedule data items, fare data items, and fare limitation information, said travel schedule data items including arrival and departure information;

means for processing said travel data including— means for merging selected ones of said travel schedule data items with applicable ones of said fare data items to create a plurality of schedule/fare data items;

means for evaluating each schedule/fare data item in accordance with said fare limitations information to provide said plurality of alternative travel itineraries;

means for scoring individual ones of said alternative travel itineraries with a relative score in accordance with said travel policy; and means for displaying said alternative travel itineraries as scored in accordance with said travel policy.

2. The invention as claimed in claim 1, said travel schedule data items including data on scheduled trips of available transportation carrier, said means for processing said travel data including means for selecting a departure point and an arrival point to create at least one city pair, said means for processing said travel data further including means for identifying said scheduled trips extending between said city pairs.

3. The invention as claimed in claim 1, said data on scheduled trips including data on direct trips and connecting trips, said means for processing said travel data including means for selectively excluding the processing of data on said connecting trips.

4. The invention as claimed in claim 3, said means for processing said travel data including means for automatically including the processing of data on said connecting trips when there are no direct trips found in said data base.

5. The invention as claimed in claim 2, said travel data including data on departure times of said scheduled trips, said means for creating said travel itineraries including means for specifying a departure range of acceptable departure times, said means for processing said travel data including means for identifying said scheduled trips between said city pairs having departure times within said departure range.

6. The invention as claimed in claim 5, said means for processing said travel data including means for automatically expanding said range of acceptable departure times if no scheduled trips between said city pairs having departure times within said specified departure range are found in said data base.

7. The invention as claimed in claim 2, said travel data including data on arrival times of said scheduled trips, said means for creating said travel itineraries including means for specifying an arrival range of acceptable arrival times, said means for processing said travel data including means for identifying said scheduled trips between city pairs having arrival times within said arrival range.

8. The invention as claimed in claim 7, said means for processing said travel data including means for automatically expanding said range of acceptable arrival times if no scheduled trips between said city pairs having arrival times within said specified arrival range are found in said data base.

9. The invention as claimed in claim 2, said means for creating travel itineraries including means for automatically excluding the selection of scheduled trips associated with predetermined ones of said transportation carriers.

10. The invention as claimed in claim 2, said means for creating said travel itineraries including means for determining when a predetermined number of travel itineraries have been created, and discontinuing the creation of additional travel itineraries when said predetermined number has been reached.

11. The invention as claimed in claim 2, said travel fare data items including data on the fares for said scheduled trips, said means for processing said travel data including means for identifying the individual fares applicable to said scheduled trips extending between said city pairs.

12. The invention as claimed in claim 11, said data base including data on the availability of the fares identified for said scheduled trips extending between said city pairs, said means for processing said travel data including means for selectively excluding the further processing of travel data pertaining to scheduled trips identified as having unavailable fares.

13. The invention as claimed in claim 11, each of said fares being presented in coded form to reflect limitations on the availability of individual fares, said means for processing said data including means for discerning said limitations from said codes and discounting the processing of fares that have unacceptable limitations.

14. The invention as claimed in claim 11, said travel data including fare limitation data reflecting limitations on the applicability of said fare data, said means for processing said travel data including means for identifying the fare limitations applicable to said fares.

15. The invention as claimed in claim 14, said fare limitations data being presented in plain language, said means for identifying the fare limitations including means for scanning and parsing said plain language.

16. The invention as claimed in claim 14, said means for processing said travel data including means for selectively excluding the further processing of travel data pertaining to scheduled trips having unacceptable fare limitations.

17. The invention as claimed in claim 2, said data base including data on intermediate stops of individual scheduled trips between said city pairs, said means for processing said travel data including means for selectively excluding the further processing of travel data pertaining to scheduled trips identified as having more than a predetermined number of intermediate stops.

18. The invention as claimed in claim 1, said data base comprising a remotely maintained data base, said means for processing said travel data including means for temporarily locally storing selected data obtained from said remote data base, said means for accessing said data including means for operably connecting said processing means and said remote data base for transfer of said selected data to said processing means, and for disconnecting said processing means from said remote data means when said selected data is locally stored.

19. The invention as claimed in claim 1, said means for scoring including means for assigning an initial score to each of said travel itineraries reflecting the monetary value of its fare.

20. The invention as claimed in claim 1, said means for scoring individual means for adjusting said scores to reflect elapsed travel time for respective individual itineraries.

21. The invention as claimed in claim 1, said means for scoring individual means for adjusting said score to reflect a predetermined carrier preference.

22. The invention as claimed in claim 1, said means for scoring including means for adjusting said score to reflect a predetermined route preference.

23. The invention as claimed in claim 1 said means for scoring including means for adjusting said score by a predetermined amount in accordance with fare limitations associated with respective individual travel itineraries.

24. A method for providing a plurality of alternative travel itineraries ranked in order of preference in accordance with a previously determined travel policy, comprising:
  accessing a data base comprising travel data including separately maintained travel schedule data items, fare data items, and fare limitation information, said travel schedule data items including arrival and departure information;
  processing said travel data to include the steps of—
  merging selected ones of said travel schedule data items with applicable ones of said fare data items to create a plurality of schedule/fare data items;
  evaluating each schedule/fare data item in accordance with said fare limitations information to provide said plurality of alternative travel itineraries;
  scoring individual ones of said alternative travel itineraries with a relative score in accordance with said travel policy, and
  displaying said alternative travel itineraries as scored in accordance with said travel policy.

25. The invention as claimed in claim 24, said travel data including data on scheduled trips of available transportation carriers, said step of processing said travel data including the step of selecting a departure point and arrival point to create at least one city pair, said processing of said travel data further including the step of identifying the scheduled trips extending between said city pairs.

26. The invention as claimed in claim 25, said data on scheduled trips including data on direct trips and connecting trips, the processing of said travel data including the step of selectively excluding the processing of data on connecting trips.

27. The invention as claimed in claim 26, the processing of said travel including the step of automatically processing data on connecting trips when there are no direct trips found in the data base.

28. The invention as claimed in claim 25 said travel data including data on departure times of said scheduled trips, the step of creating said travel itineraries including the step of specifying a departure range of acceptable departure times, the processing of said travel data including the step of identifying scheduled trips between city pairs that have departure times within said departure range.

29. The invention as claimed in claim 28, the processing of said travel data including the step of automatically expanding the range of acceptable departure times if no scheduled trips between city pairs having departure times within the specified departure range are found in the data base.

30. The invention as claim in claim 25, said travel data including data on arrival times of said scheduled trips, the step of creating said travel itineraries including the step of specifying an arrival range of acceptable arrival times, the processing of said travel data including the step of identifying scheduled trips between city pairs having arrival times within said arrival range.

31. The invention as claim in claim 30, the processing of said travel data including the step of automatically expanding the range of acceptable arrival times if no scheduled trips between city pairs having arrival times within the specified arrival range are found in the data base.

32. The invention as claimed in claim 25, the step of creating said travel itineraries including the step of automatically excluding the selection of scheduled trips associated with predetermined ones of said transportation carriers.

33. The invention as claimed in claim 25, the step of creating said travel itineraries including the step of determining when a predetermined number of travel itineraries have been created, and discontinuing the creation of additional travel itineraries when the predetermined number has been reached.

34. The invention as claimed in claim 25, said fare data items including data on the fares for said scheduled trips, the step of processing said travel data including the step of identifying the individual fares applicable to said scheduled trips extending between said city pairs.

35. The invention as claimed in claim 34, the data base including data on the availability of the fares identified for said scheduled trips extending between said city pairs, the step of processing said travel data including the step of selectively excluding further processing of travel data pertaining to scheduled trips identified as having unavailable fares.

36. The invention as claimed in claim 34, each of said fares being presented in coded form to reflect limitations on the availability of individual pairs, the step of processing said data including means for discerning said limitations from said codes and discounting the processing of fares that have unacceptable limitations.

37. The invention as claimed in claim 34, said travel data including fare limitation data reflecting limitations on the applicability of said fare data, the step of processing said travel data including the step of identifying the fare limitations applicable to the fares.

38. The invention as claimed in claim 37, said fare limitations data being presented in plain language, the step of identifying the fare limitations including the step of scanning and parsing the plain language.

39. The invention as claimed in claim 38, the step of processing said travel data including the step of selectively excluding the further processing of travel data pertaining to scheduled trips having unacceptable fare limitations.

40. The invention as claimed in claim 25 the data base including data on intermediate stops of individual scheduled trips between said city pairs, the step of processing said travel data including the step of selectively excluding the further processing of travel data pertaining to scheduled trips identified as having more than a predetermined number of intermediate stops.

41. The invention as claimed in claim 24, said data base comprising a remotely maintained data base, the step of processing said travel data including the step of temporarily storing selected data obtained from said remote data base in a local data base, the step of accessing said data including the step of transferring said selected data from the remote data base to the local data base for local processing of said travel data.

42. The invention as claimed in claim 24, the step of scoring said proposed travel itineraries including the step of assigning an initial score to each of said travel itineraries reflecting the monetary value of its fare.

43. The invention as claimed in claim 24, the step of scoring said travel itineraries including the step of adjusting said score to reflect elapsed travel time for respective individual itineraries.

44. The invention as claimed in claim 24, the step of scoring said travel itineraries the step of adjusting said score to reflect a predetermined carrier preference.

45. The invention as claimed in claim 24, the step of scoring said travel itineraries including the step of adjusting said score to reflect a predetermined route preference.

46. The invention as claimed in claim 24, the step of scoring said travel itineraries including the step of adjusting said score to reflect elapsed travel time.

47. The invention as claimed in claim 24, the step of scoring said travel itineraries the step of adjusting said score by a predetermined amount in accordance with fare limitations associated with respective individual travel itineraries.

48. The invention as claimed in claim 24, including the step of compiling an optimization list of pertinent fare limitations information as said fare limitations are retrieved from said data base whereby subsequent schedule/fare data items may be evaluated in accordance with said optimization list without accessing said data base for said fare limitations information.

* * * * *

UNITED STATES PATENT AND TRADEMARK OFFICE
CERTIFICATE OF CORRECTION

PATENT NO. : 4,862,357
DATED : August 29, 1989
INVENTOR(S) : Mark L. Ahlstrom et al.

It is certified that error appears in the above-identified patent and that said Letters Patent is hereby corrected as shown below:

Column 4, line 17, delete the word "b" and substitute therefor --be--.

Column 6, line 64, delete the word "flows" and substitute therefor --flow--.

Column 9, line 5, delete the words "same that" and substitute therefor --same route that--.

Column 9, line 11, delete the word "as" and substitute therefor --such as--.

Column 9, line 11, delete the word "limitations" and substitute therefor --limitations)--.

Column 9, line 10, delete the word "categorizes" and substitute therefor --categories--.

Column 9, line 18, delete the words "F 7" and substitute therefor --Fig. 7--.

UNITED STATES PATENT AND TRADEMARK OFFICE
CERTIFICATE OF CORRECTION

PATENT NO. : 4,862,357

DATED : August 29, 1989

INVENTOR(S) : Mark L. Ahlstrom et al.

It is certified that error appears in the above-identified patent and that said Letters Patent is hereby corrected as shown below:

Column 10, line 9, delete the words "alternative from" and substitute therefor --alternative structures from--.

Column 10, line 16, delete the word "structure," and substitute therefor --structures,--.

Column 10, line 46, delete the words "the city" and substitute therefor --the other city--.

Column 10, line 53, delete the word "flight" and substitute therefor --flights--.

Column 14, line 24, delete the word "discounting" and substitute therefor --discontinuing--.

Column 14, line 63, delete the word "individual" and substitute therefor --including--.

Column 14, line 63, delete the word "scores" and substitute therefor --score--.

Column 14, line 67, delete the word "individual" and substitute therefor --including--.

UNITED STATES PATENT AND TRADEMARK OFFICE
CERTIFICATE OF CORRECTION

PATENT NO. : 4,862,357

DATED : August 29, 1989

INVENTOR(S) : Mark L. Ahlstrom et al.

It is certified that error appears in the above-identified patent and that said Letters Patent is hereby corrected as shown below:

Column 15, line 45, delete the words "travel including" and substitute therefor --travel data including--.

Column 15, line 62, delete the words "as claim" and substitute therefor --as claimed--.

Column 16, line 1, delete the words "as claim" and substitute therefor --as claimed--.

Column 16, line 34, delete the word "discounting" and substitute therefor --discontinuing--.

Column 17, line 8, delete the words "itineraries the" and substitute therefor --itineraries including the--.

UNITED STATES PATENT AND TRADEMARK OFFICE
CERTIFICATE OF CORRECTION

PATENT NO. : 4,862,357

DATED : August 29, 1989

INVENTOR(S) : Mark L. Ahlstrom et al

It is certified that error appears in the above-identified patent and that said Letters Patent is hereby corrected as shown below:

Column 18, line 4, delete the words "itineraries the" and substitute therefor --itineraries including the--.

Signed and Sealed this

Eleventh Day of September, 1990

Attest:

Attesting Officer

HARRY F. MANBECK, JR.

Commissioner of Patents and Trademarks